H. A. GALT.
PROCESS OF RECOVERING VALUES FROM WASTE LIME MUD.
APPLICATION FILED FEB. 5, 1915.
1,249,739.
Patented Dec. 11, 1917.
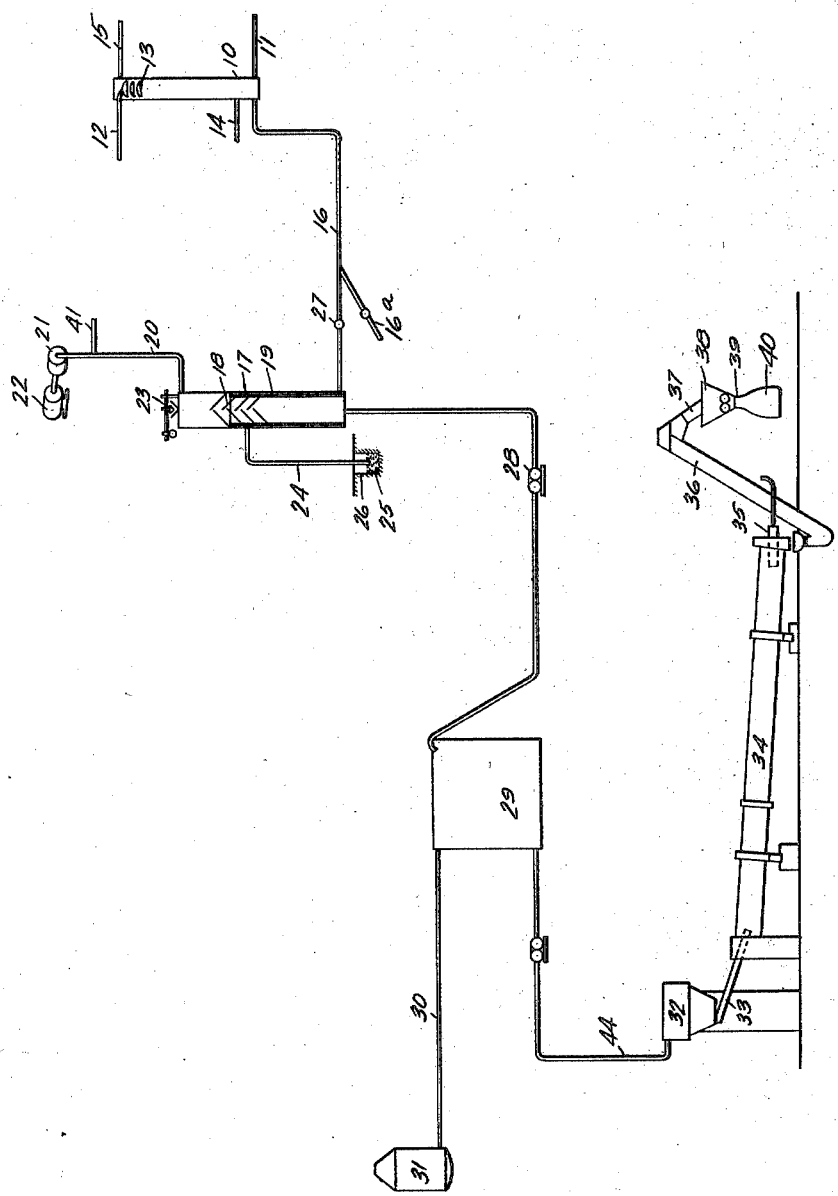

UNITED STATES PATENT OFFICE.

HUGH A. GALT, OF AKRON, OHIO, ASSIGNOR TO COLUMBIA CHEMICAL COMPANY, OF BARBERTON, OHIO, A CORPORATION OF PENNSYLVANIA.

PROCESS OF RECOVERING VALUES FROM WASTE LIME MUD.

1,249,739.  Specification of Letters Patent.  Patented Dec. 11, 1917.

Application filed February 5, 1915. Serial No. 6,320.

*To all whom it may concern:*

Be it known that I, HUGH A. GALT, a resident of Akron, in the county of Summit and State of Ohio, have invented a new and useful Improvement in Processes of Recovering Values from Waste Lime Mud, of which the following is a specification.

This invention relates to a process of recovering values from waste material, and particularly the lime mud produced in the ammonia soda process for the manufacture of crude bicarbonate of soda. In this process, as commonly carried out, a common salt solution is treated with carbonic acid and ammonia gases to form crude bicarbonate of soda, ammonium chlorid and some ammonium carbonate. After separation of the crude bicarbonate the solution is treated in stills for recovering the ammonia, which is present in solution as carbonate and chlorid. One step in the treatment of the solution in said stills involves the introduction of milk of lime thereinto for distilling the combined ammonia gas, which otherwise would not separate wholly and freely. The waste product of these stills therefore contains salts of calcium, together with other substances, such as sodium chlorid, all of which is not decomposed in the carbonating process, and also large quantities of hot waste liquors and steam. This product has heretofore, been almost wholly a waste product, as it has commonly been blown out in slurry form or dumped upon vacant land near the plant, thereby increasing the total cost of the bicarbonate, due to the wasted investment in the dumping land required, and also the loss of the steam, calcium compounds and other valuable contents of the mud.

This invention has for its object the recovery of values from the waste product of the ammonia stills with the end of ultimately reducing the cost of the crude bicarbonate by increasing the total revenues of the plant.

Briefly stated, the invention consists in first separating the steam from the product of the stills and utilizing it in any suitable or convenient way to recover the otherwise lost power thereof and then separating the remaining material into liquid and solid portions, the liquid being treated for the recovery of the soluble constituents contained therein, and the insoluble portion being also treated in a manner to produce useful material, such for example as fertilizer.

The invention comprises the several method steps hereinafter described and claimed.

In the drawing, the view represents diagrammatically a system arranged for carrying out the method.

One of the ammonia stills before referred to is represented at 10. It consists of a high cylindrical retort which is heated in any suitable manner, as by introducing steam thereinto through the steam supply conduit 11. Said still is provided in its upper portion with an inlet 12 through which the solution to be treated is introduced. This solution is that which remains after the separation of the crude bicarbonate from the original salt solution treated in the ammonia soda process with carbonic acid and ammonia gases. Said solution contains some free ammonia, ammonium chlorid and some ammonium carbonate. The stills are provided with suitable baffles 13 therein over which the solution trickles to break it up and promote the separation of the ammonia therefrom. A large proportion of the free ammonia separates readily in the upper portion of the still. The still is also provided above its bottom with an inlet 14 for the milk of lime solution. This mixes with the solution being treated and as the whole apparatus is heated such free ammonia as has not separated, together with the ammonia combined with the carbonate and chlorid are distilled off. All of the ammonia gas is conducted away from the still through a conduit 15 and is utilized over again in the treatment of further salt solution. The waste product of the still is conducted away through a bottom outlet pipe 16. This product is a solution or slurry and contains calcium carbonate, calcium hydrate, calcium and sodium chlorid solutions, and a small amount of silica or silicates from the rock of which the lime is made. It also contains a considerable quantity of steam and liquor at a temperature above the boiling point due to the pressure maintained on the still, so that when the mixture is discharged into the open air large quantities of steam are given off therefrom. This steam has always been a source of loss from two standpoints, first, because of the loss of power which it necessarily entailed, and second, because it invariably carries a certain quantity of salt therewith and has consequently produced a corrosive effect upon surrounding metallic objects with which it comes in contact, such for example, as the bolts, spikes and rails in the tracks around the plant and the metal roofing, pipes and stacks upon the buildings.

The solid and liquid material in the form of a slurry discharged from the still 10 is conducted through the conduit 16 to the bottom of a steam recovery tank 17 of relatively large capacity and in which are located suitable baffles 18. These baffles are preferably each provided with a separate conduit or duct 19 for leading the liquid produced by condensation directly downwardly to the bottom of the tank, so that the condensed liquid is separated quickly from the steam. The latter rises slowly through the large tank and the separation of the liquid therefrom is so complete that the steam finally discharged from the upper portion of the tank is substantially pure and wholly free from salts of any kind. This steam is carried out through a pipe or conduit 20 for use in various ways. For example, said conduit may lead to a suitable low pressure turbine 21 which is connected to drive an electric generator 22. The power produced by said generator may be utilized in any suitable way, and is ordinarily used to run the machinery of the plant and furnish the necessary power for lighting and power or it may be used in other ways. The steam may also be conducted through a pipe 41 to evaporating tanks or kettles to furnish the heat therefor or may be used in various other ways.

The pressure in the separating tank 17 may be regulated in any suitable way, such as by an ordinary safety valve 23 loaded to the proper point, say for example, two pounds. Whenever the pressure in said tank exceeds this amount the valve opens and the excess pressure blows off. Suitable means is preferably also provided for preventing the liquid in the tank 17 overflowing through the steam outlet conduit 20 and finding its way to the turbine. In the present system the tank 17 is provided intermediate its top and bottom with a downcomer 24 whose lower end is sealed at 25 by the water in the bottom of the well 26. The downcomer 24 is preferably connected to the tank 17 some distance below its top. If the level of material in said tank reaches the downcomer 24 the tank overflows into the well 26 and when the latter fills the material runs out upon the ground. The capacity of the well 26 is small as compared with the size of the tank 17, and the volume of the space in the upper portion of said tank above the downcomer 24 is such that the overflow of the well 26 gives ample warning to the operator to enable him to close a valve 27 in conduit 16 and shut off the supply of material to the tank. The operator then opens a valve in a branch pipe 16ª which carries the waste product to dumping ground until the level of material in the tank lowers sufficiently to require further supply thereto.

The level of liquid in the tank 17 is controlled by a suitable pump 28 which conducts the liquid and solid material in said tank to a settling tank 29. This pump is run at the proper speed to take care of the entire supply of material delivered to the tank 17. Its speed may be adjusted with variations in the rate of supply of the material in any suitable manner, either by hand or by any automatic mechanism. The settling tank 29 is of comparatively large capacity and the material supplied thereto settles so rapidly that the solution near the top of the tank is clear. It includes the sodium and calcium chlorids. Said solution is conducted through a conduit 30 to an evaporating tank 31 where the material is evaporated until the sodium chlorid crystallizes, leaving the calcium chlorid in solution. After separation of the crystallized salt the calcium chlorid solution may be evaporated to recover the calcium chlorid. Both products of the evaporating tank 31 are substantially pure and may be used commercially in any suitable manner. The sodium chlorid, for example, may be utilized for the production of further crude bicarbonate and the calcium chlorid in the usual way.

The solid material in the settling tank 29 is pumped as a thin mud or slurry through a conduit 44 to a suitable press, such as the rotary vacuum filter press 32, which removes most of the water, leaving a solid, comparatively dry material containing about 40 per cent. moisture, together with sodium and calcium chlorids, a large amount of calcium carbonate, some calcium hydrate, and small amounts of silicates.

This material is conveyed through the trough 33 to a rotary kiln 34 heated in any suitable manner, as by the gas burner 35. In this kiln all of the water and carbonic acid gas are driven off and the calcium carbonate and hydrate are burned to the oxid. The product of the kiln emerges in small fragments of the size of a pea and upward, and is discharged into the buckets or cars of a conveyer or elevator 36 which discharges through a trough 37 into a suitable crushing mill 38. This mill grinds the material into fine pulverent form and discharges it through a nozzle 39 where it is filled into suitable containers, such as the bags 40. The product of this mill is largely lime but it also contains some silica and appreciable quantities of salt and calcium chlorid. It is found to be very efficient for use as fertilizer.

The method described is very profitable as it enables substantially all of the material produced in the ammonia soda process for the manufacture of crude bicarbonate to be put to some useful purpose. The saving in the steam alone justifies the practice of the method, and said method can be carried out economically for this purpose alone, even if it is not carried further. By treating the solid and liquid substances in the manner stated, however, some of the salt is recovered for further use in the ammonia soda process, the calcium chlorid is all recovered, and the other solid substances which ordinarily have been a wholly waste product are converted into fertilizer, a portion of the salt going with said fertilizer and improving its value in soil treatment. The method materially reduces the cost of the crude bicarbonate, due to the high values which are recovered from otherwise waste product.

What I claim is:—

1. The process of utilizing the lime and steam mud from the ammonia soda process, which consists in conducting said materials which are heated and under pressure to a separating tank to separate the steam from the superheated waste material, separating the remaining material into liquid and solid portions, and drying, heating and crushing the solid portions to make a fertilizing material.

2. The process of utilizing the lime and steam mud from the ammonia soda process, which consists in passing said waste material which is heated and under pressure into a separating tank to separate the steam for use, separating the remaining material into liquid and solid portions, evaporating the liquid to obtain salts therefrom, and drying, heating and crushing the solid material to make a fertilizer.

In testimony whereof, I have hereunto set my hand.

HUGH A. GALT.

Witnesses:
R. H. COPELAND,
D. N. CLAUSE.